US012576905B1

(12) United States Patent
Bari

(10) Patent No.: US 12,576,905 B1
(45) Date of Patent: Mar. 17, 2026

(54) SMART STEERING KIT FOR TRADITIONAL STEERING GEARS

(71) Applicant: ZF CV Systems Global GmbH, Bern (CH)

(72) Inventor: Praful Bari, West Lafayette, IN (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/888,264

(22) Filed: Sep. 18, 2024

(51) Int. Cl.
  *B62D 5/04* (2006.01)
  *B62D 3/14* (2006.01)
  *B62D 65/02* (2006.01)
  *F16D 1/00* (2006.01)

(52) U.S. Cl.
  CPC ......... *B62D 5/0403* (2013.01); *B62D 5/0421* (2013.01); *B62D 65/02* (2013.01); *F16D 1/00* (2013.01); *B62D 3/14* (2013.01)

(58) Field of Classification Search
  CPC ........... B62D 5/04–0403; B62D 5/0421–0427; B62D 3/00–302; B62D 5/00; B62D 65/02; F16D 1/00; F16L 23/02; F16L 27/08–0808; F16C 17/02; F16C 17/10
  See application file for complete search history.

(56) References Cited

U.S. PATENT DOCUMENTS

2019/0092374 A1* 3/2019 Nofzinger .............. B62D 5/006
2019/0363605 A1* 11/2019 Kim ......................... H02K 5/24
2020/0231203 A1* 7/2020 Reifschneider ........ B62D 3/126

* cited by examiner

*Primary Examiner* — Matthew P Travers
(74) *Attorney, Agent, or Firm* — LEYDIG, VOIT & MAYER, LTD.

(57) ABSTRACT

A kit for connecting an output shaft of an electric motor to an input shaft of a steering gear of a steering system includes: a housing including: a central section having a first central section end and a second central section end, the central section defining an adapter assembly passage extending in a longitudinal direction between the first central section end and the second central section end, an electric motor bracket disposed on the first central section end, and a steering gear bracket disposed on the second central section end; and an adapter assembly having a first adapter assembly end and a second adapter assembly end. The adapter assembly is disposable in the adapter assembly passage such that the first adapter assembly end is connectable to the output shaft and the second adapter assembly end is connectable to the input shaft.

20 Claims, 18 Drawing Sheets

SECTION VIEW A-A

SECTION VIEW A-A

SMART STEERING KIT FOR TRADITIONAL STEERING GEARS

TECHNICAL FIELD

The present disclosure generally relates to kits and methods that facilitate connection of an electric motor to a steering gear of vehicle's steering system.

BACKGROUND

The advent of automated driver assistance systems ("ADAS") has resulted in the need to modify conventional hydraulic steering systems of vehicles to include an electric motor to facilitate steering, both automated and non-automated, of the vehicle. Incorporation of the electric motor into a hydraulic steering system provides various benefits, including easier steering efforts while the vehicle is both in motion and stationary, smooth handling and adaptive steering feel from low to high speeds, consistent steering experience independent of road conditions, excellent reversibility from any turn angle at any vehicle speed while driving forward and backward, and cross-wind and road crown compensation, among others.

Such electric motors are typically mechanically positioned between the steering shaft, which is controlled by the operator of the vehicle through a steering wheel, and the steering gear, which converts the steering commands inputted by the driver through the steering wheel into steering outputs that move the steering wheels of the vehicle. By positioning the electric motor in this manner, the electric motor facilitates steering operations of the vehicle. Addition of an electric motor to a hydraulic steering system greatly expands the ability to control the steering of the vehicle, and can convert the hydraulic steering system into a "smart" steering system.

There is a need to develop solutions for more easily integrating electric motors into hydraulic steering systems.

SUMMARY

One aspect of the present disclosure is directed to a kit for connecting an output shaft of an electric motor to an input shaft of a steering gear, the kit comprising: a housing comprising: a central section having a first central section end and a second central section end, the central section defining an adapter assembly passage extending in a longitudinal direction between the first central section end and the second central section end, an electric motor bracket disposed on the first central section end, and a steering gear bracket disposed on the second central section end; and an adapter assembly having a first adapter assembly end and a second adapter assembly end, wherein the adapter assembly is disposable in the adapter assembly passage such that the first adapter assembly end is connectable to the output shaft and the second adapter assembly end is connectable to the input shaft.

Another aspect of the present disclosure is directed to a method for connecting an output shaft of an electric motor to an input shaft of a steering gear, the method comprising: connecting an adapter assembly to the output shaft; connecting a housing to the steering gear, the housing comprising a central section having a first central section end and a second central section end, the central section defining an adapter assembly passage extending in a longitudinal direction between the first central section end and the second central section end; disposing the adapter assembly in the adapter assembly passage; connecting the adapter assembly to the input shaft; and connecting the housing to the electric motor.

BRIEF DESCRIPTION OF THE DRAWINGS

FIG. 9A, FIG. 9B, FIG. 9C, FIG. 8D and FIG. 9E show how an adapter assembly of the kit of FIG. 1 connects to an output shaft of an electric motor;

FIG. 11A, FIG. 11B and FIG. 11 C show a housing of the kit of FIG. 1 being disposed between an output shaft of an electric motor and an input shaft of a steering gear;

DETAILED DESCRIPTION

The kits and methods described herein improve the performance, efficiency, and reliability of conventional hydraulic steering systems by facilitating incorporation therein of an electric motor.

Figure 1:
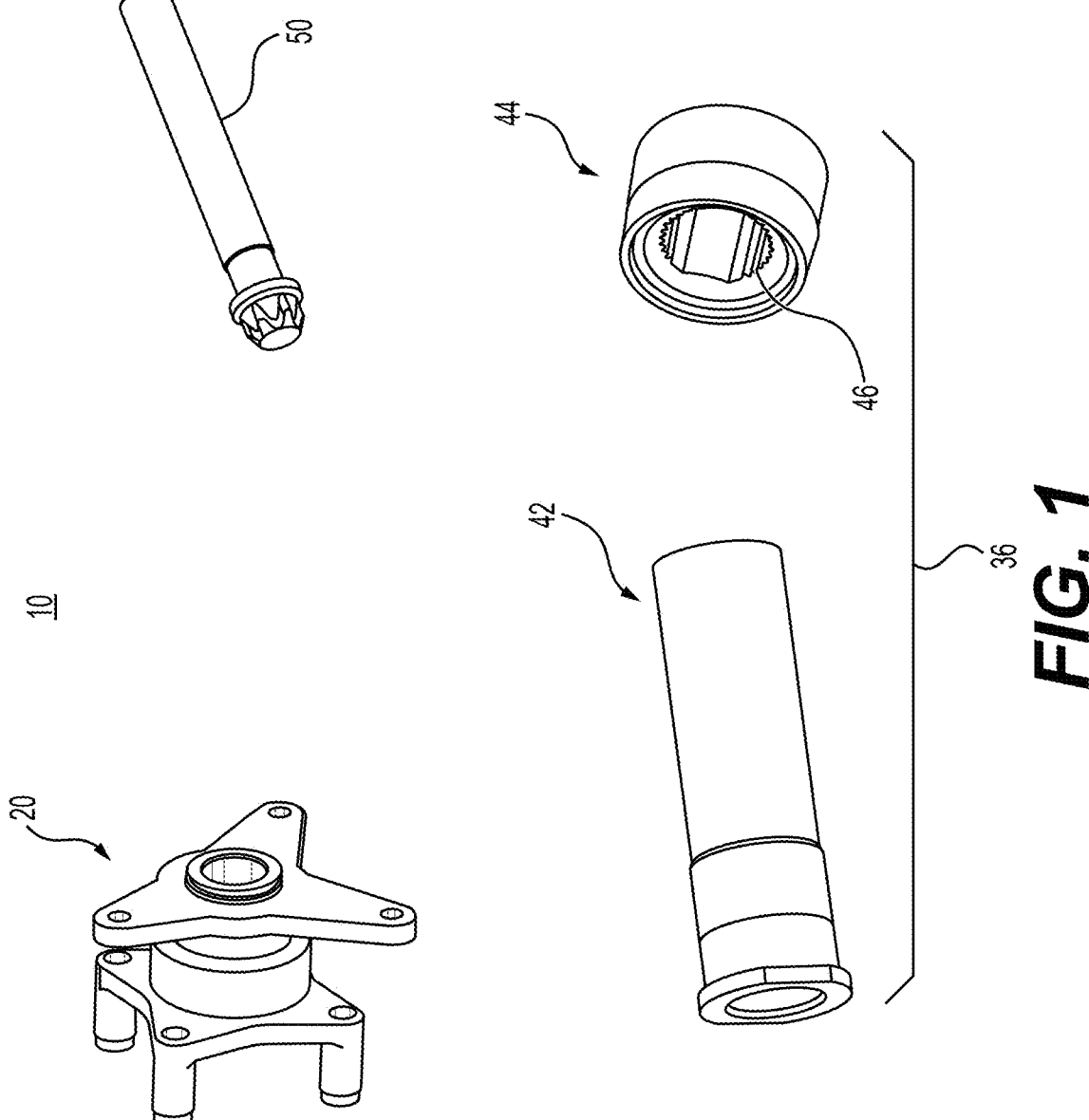
FIG. 1 shows a kit for connecting an output shaft of an electric motor to an input shaft of a steering gear.

FIG. 1 shows a kit 10 for connecting an output shaft of an electric motor to an input shaft of a steering gear. The kit 10 may include various components, such as a housing 20, an adapter assembly 36 that may include a first adapter component 42 and a second adapter component 44, and, optionally, one or more fasteners 50. The one or more fasteners 50 may be any type of fastener known in the art, and different types of fasteners 50 may be included in the kit 10 depending on the particular application for which the fastener 50 may be used.

Figure 2:
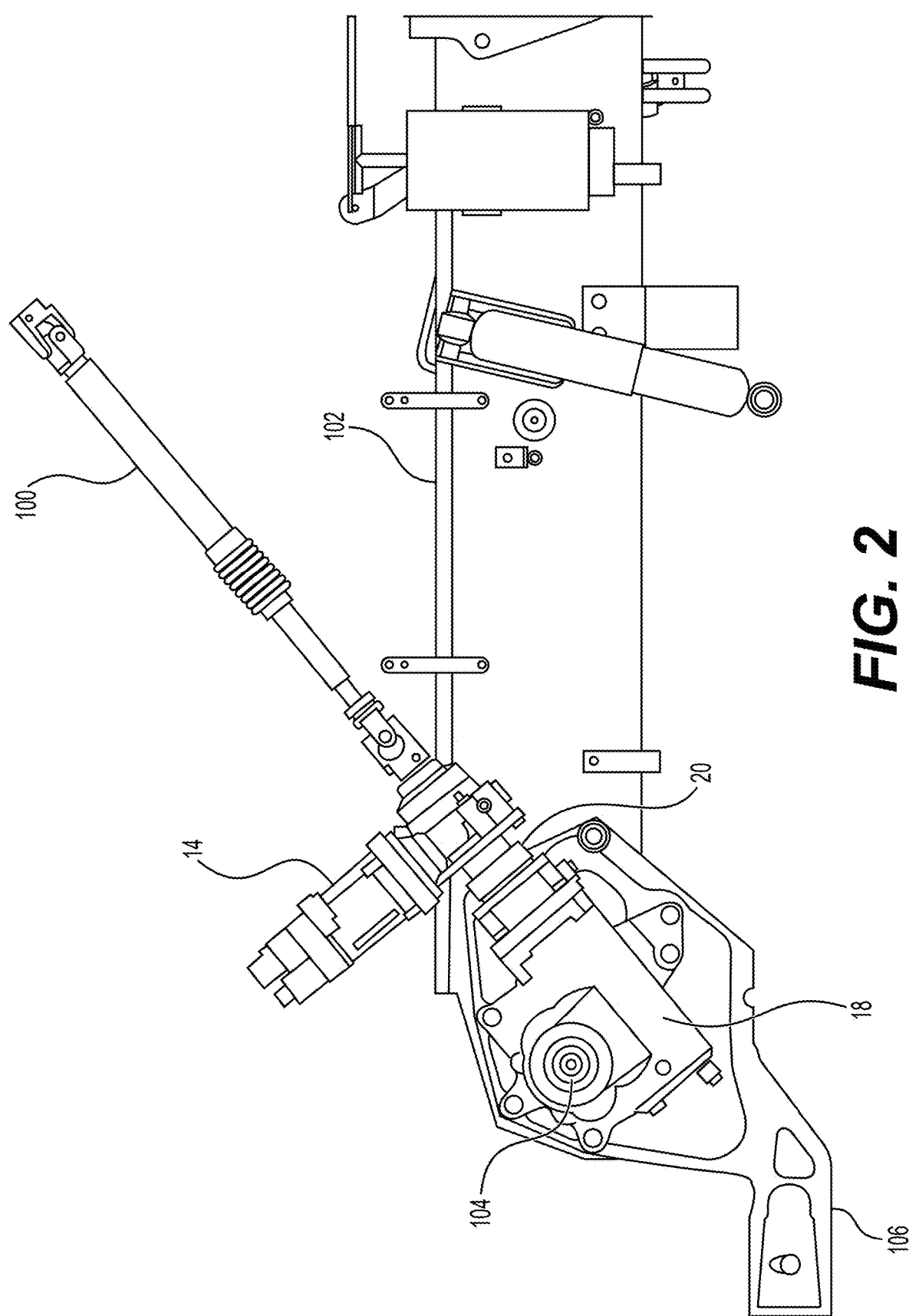
FIG. 2 shows the kit of FIG. 1 connecting an output shaft of an electric motor to an input shaft of a steering gear, with the resulting assembly fitted to a base frame and multi-function bracket of a vehicle.
Figure 6:
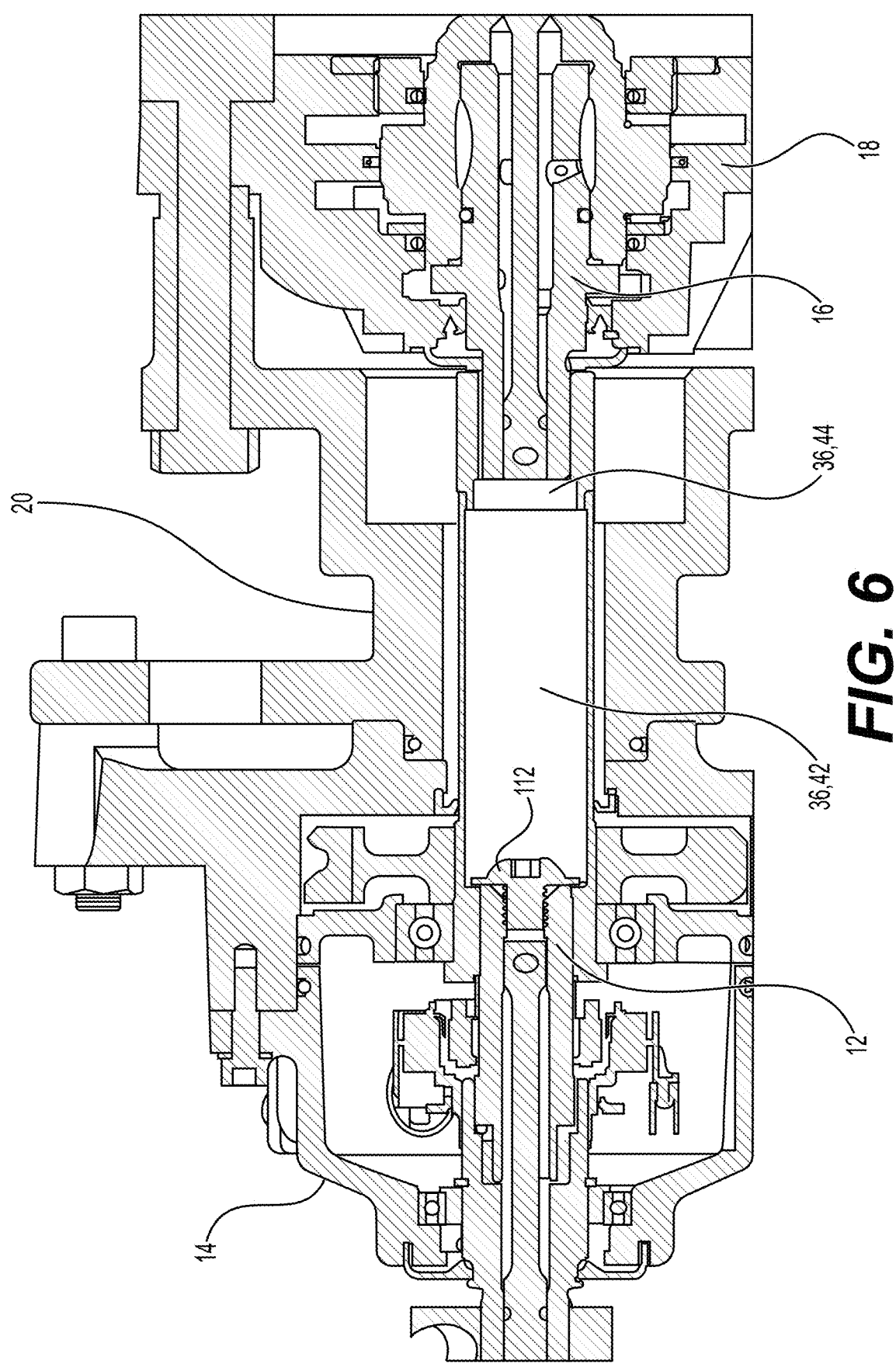
FIG. 6 shows a cross-sectional view of an adapter assembly of the kit of FIG. 1 disposed in an adapter assembly passage of a housing of the kit of FIG. 1.

FIG. 2 shows, in the context of a steering system of a vehicle, how kit 10 may be used to connect an output shaft 12 of an electric motor 14 to an input shaft 16 of a steering gear 18. Further details of this connection are shown in FIG. 6. Returning to FIG. 2, a steering shaft 100 may be connected to the output shaft 12 of electric motor 14. An operator of the vehicle in which the components described herein are installed may use steering shaft 100 to provide steering input to steering gear 18 (e.g., via a steering wheel). Steering gear 18, in turn, has a sector shaft 104 that may be used to control the steering wheels of the vehicle in order to steer the vehicle. Steering gear 18 may be mounted in a multi-function bracket 106. Multi-function bracket 106 may be connected to a base frame 102 of the vehicle.

FIGS. 3A-3F show details of a housing 20 of kit 10. Housing 20 may include a central section 22 having a first central section end 24 and a second central section end 26. The central section 22 defines an adapter assembly passage 30 extending in a longitudinal direction L between the first central section end 24 and the second central section end 26. The longitudinal direction L extends along a length of housing 20. Housing 20 may include an electric motor bracket 32 disposed on the first central section end 24, and a steering gear bracket 34 disposed on the second central section end 26. The electric motor bracket 32 may include at least one electric motor bracket fastener guide 52 configured to receive a fastener 50. The steering gear bracket 34 may include at least one steering gear bracket fastener guide 54 configured to receive a fastener 50.

Electric motor bracket 32 may include a plurality of electric motor bracket tabs 56 extending in a radial direction R, the radial direction R being perpendicular to the longitudinal direction L. Each electric motor bracket tab 56 may include one or more electric motor bracket fastener guides 52 configured to receive a fastener 50. Each electric motor bracket fastener guide 52 may extend in the longitudinal direction L. In an embodiment, electric motor bracket 32 may have three electric motor bracket tabs 56.

Steering gear bracket 34 may include a plurality of steering gear bracket tabs 58 extending in radial direction R. Each steering gear bracket tab 58 may include one or more steering gear bracket fastener guides 54 configured to receive a fastener 50. Each steering gear bracket fastener guide 54 may extend in the longitudinal direction L. In an embodiment, steering gear bracket 34 may have four steering gear bracket tabs 58.

Figures 3A, 3B, 3C, 3D, 3E, 3F:
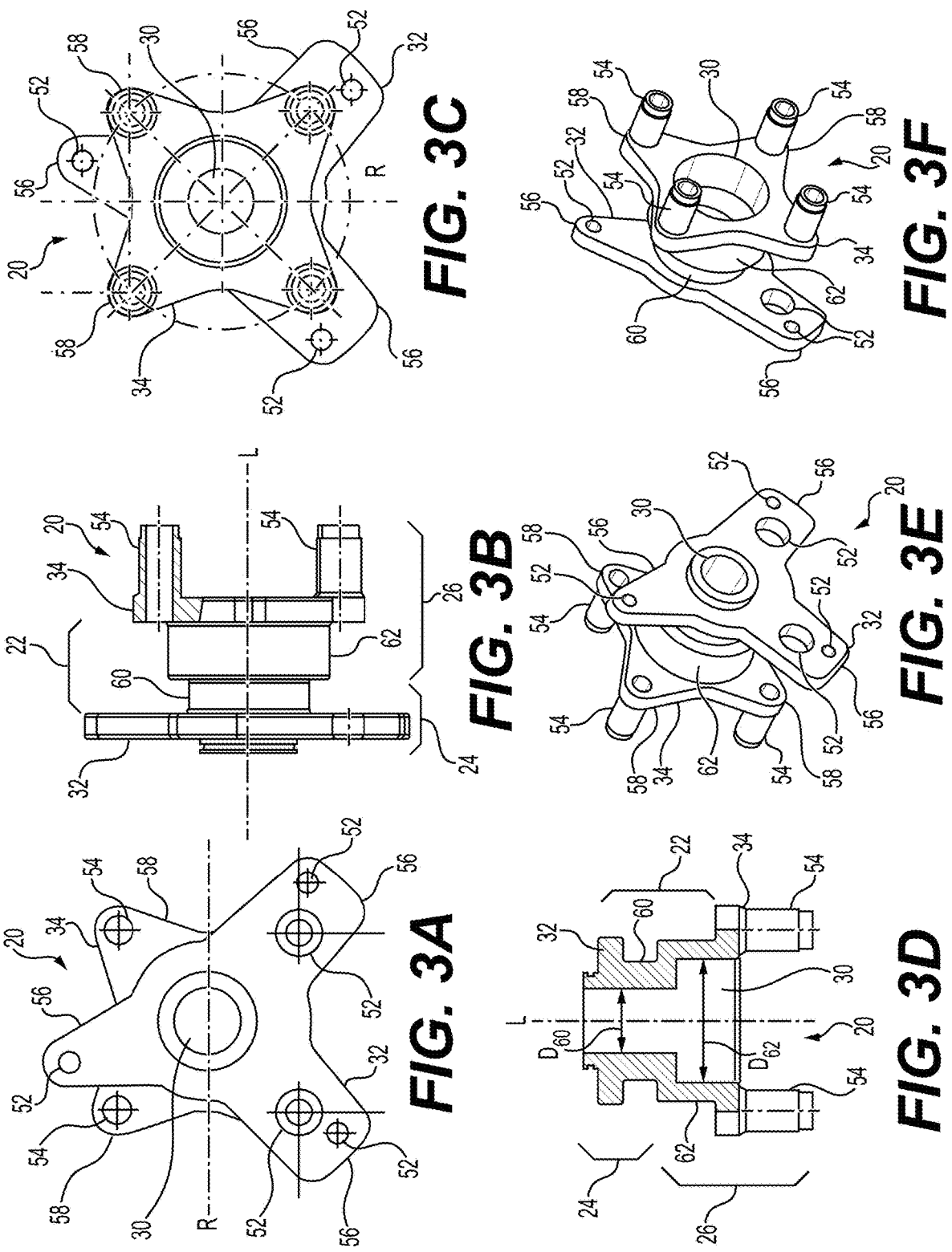
FIG. 3A, FIG. 3B, FIG. 3C, FIG. 3D, FIG. 3E and FIG. 3F show details of a housing of the kit of FIG. 1.
Figures 4A, 4B, 4C, 4D:
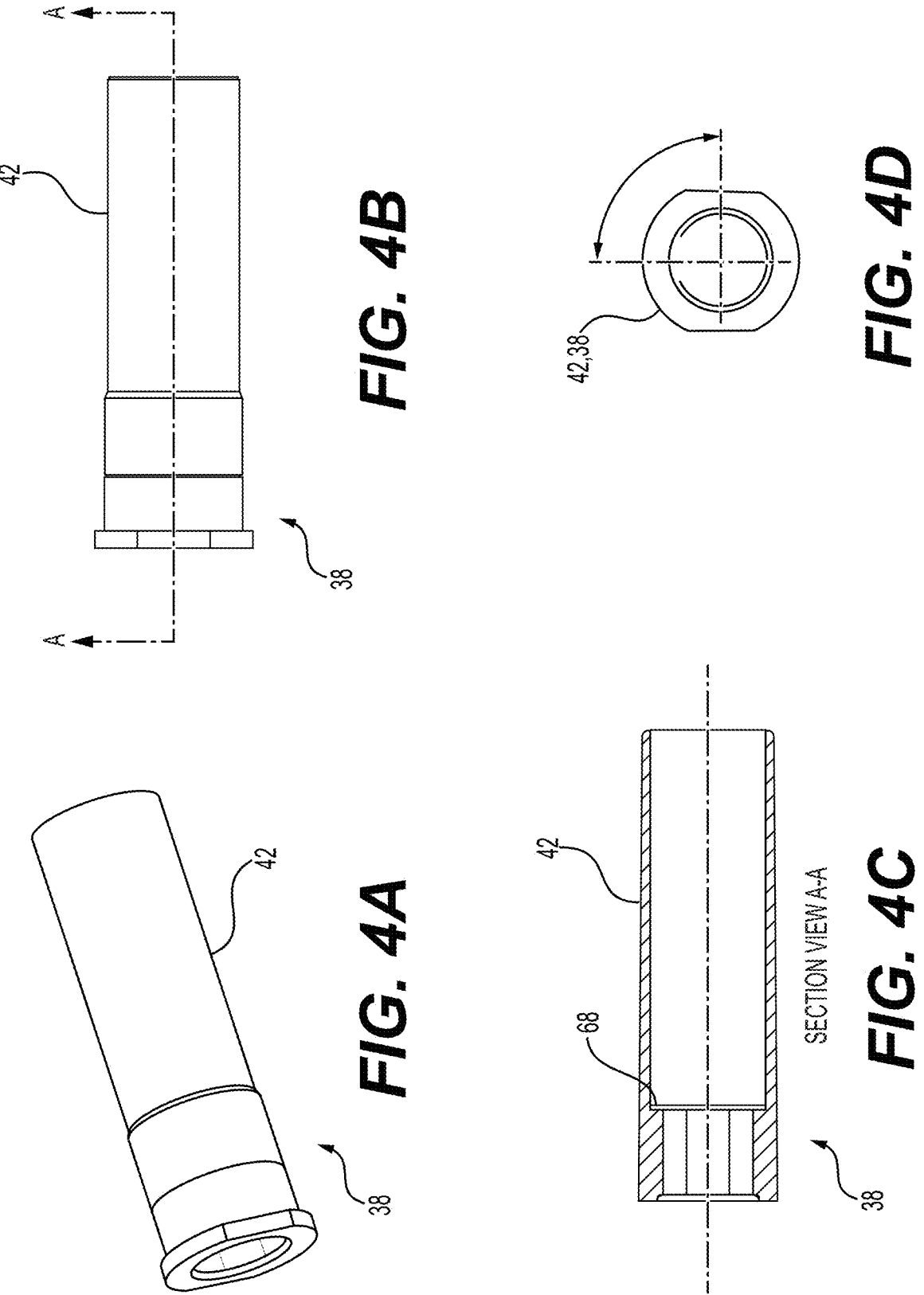
FIG. 4A, FIG. 4B, FIG. 4C and FIG. 4D show details of a first adapter component of the kit of FIG. 1.

In an embodiment, central section 22 of housing 20 has a first central section part 60 having a first inner diameter $D_{60}$ and a second central section part 62 having a second inner diameter $D_{62}$, as shown most clearly in FIG. 3D. First inner diameter $D_{60}$ may not be equal to second inner diameter $D_{62}$. Adapter assembly passage 30 of housing 20 may be defined by first central section part 60 and second central section part 62.

As shown in FIGS. 4A-7C, kit 10 may also include an adapter assembly 36 having a first adapter assembly end 38 and a second adapter assembly end 40. As shown in FIG. 6, adapter assembly 36 is disposable in the adapter assembly passage 30 of housing 20 such that the first adapter assembly end 38 is connectable to the output shaft 12 of electric motor 14 and the second adapter assembly end 40 is connectable to the input shaft 16 of steering gear 18. Adapter assembly 36 may be disposable in the adapter assembly passage 30 so as to be concentric with the adapter assembly passage 30.

Figures 5A, 5B, 5C:
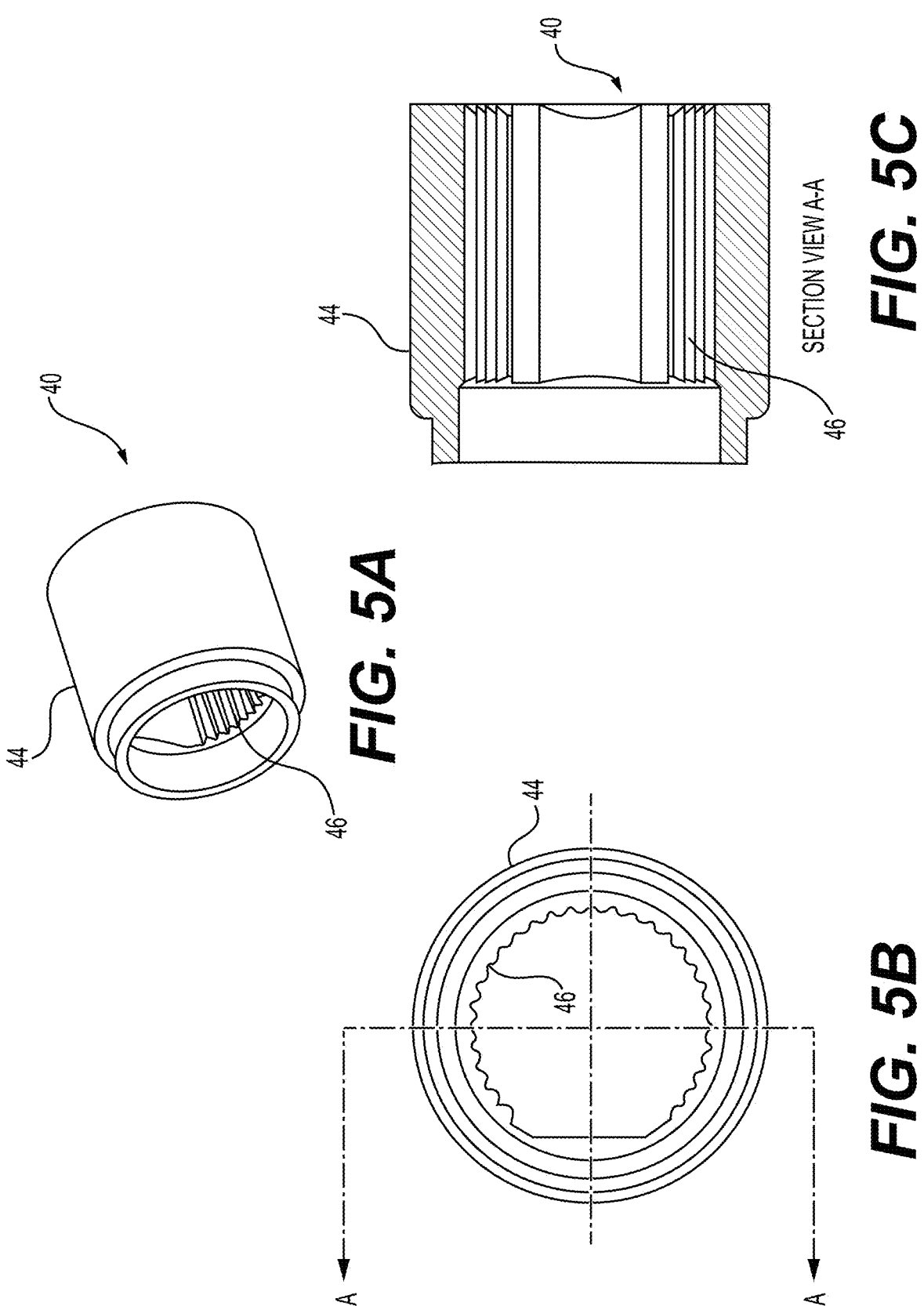
FIG. 5A, FIG. 5B and FIG. 5C show details of a second adapter component of the kit of FIG. 1.
Figure 7C:
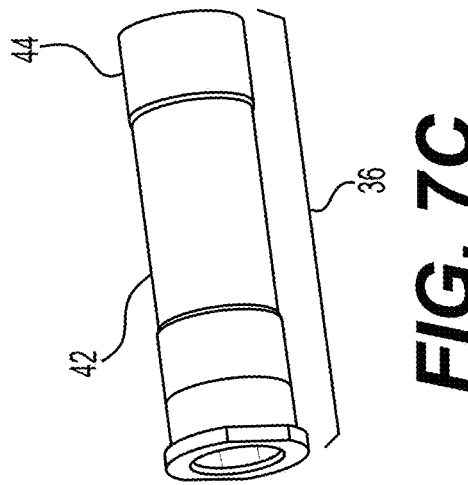
FIG. 7A, FIG. 7B and FIG. 7C show details of an adapter assembly of the kit of FIG. 1.
Figure 7B:
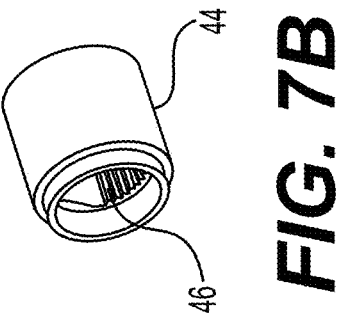
Figure 7A:
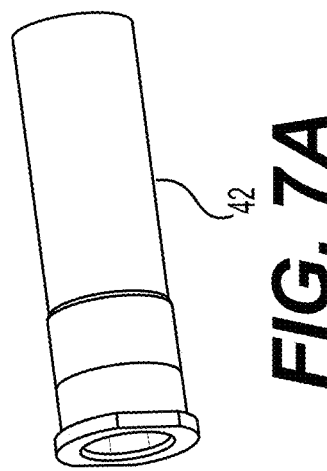

In an embodiment, adapter assembly 36 may include a first adapter component 42, as shown in FIGS. 4A-4D, and a second adapter component 44, as shown in FIG. 5A-5C. As shown in FIGS. 7A-7C, first adapter component 42 and second adapter component 44 may be fitted together (e.g., due to a tolerance fit therebetween) to form adapter assembly 36. After being fitted together, first adapter component 42 and second adapter component 44 may be fixed with respect to one another (e.g., by welding).

To facilitate connection of second adapter component 44 to input shaft 16 of steering gear 18, second adapter component 44 may include a plurality of serrations 46, as shown in FIG. 5A-5C, configured to engage with a plurality of serrations 46 on the input shaft 16.

FIGS. 8A-12 show how to use the kit of FIG. 1 to connect output shaft 12 of electric motor 14 to input shaft 16 of steering gear 18. Although these figures contemplate that adapter assembly 36 includes a first adapter component 42 and a second adapter component 44, adapter assembly 36 may instead be a single component.

FIGS. 8A-8D show preparation of adapter assembly 36, which may include fixing the first adapter component 42 to the second adapter component 44. Such fixing may occur prior to connecting the adapter assembly 36 to the output shaft 12 of electric motor 14.

Figures 8A, 8B, 8C, 8D:
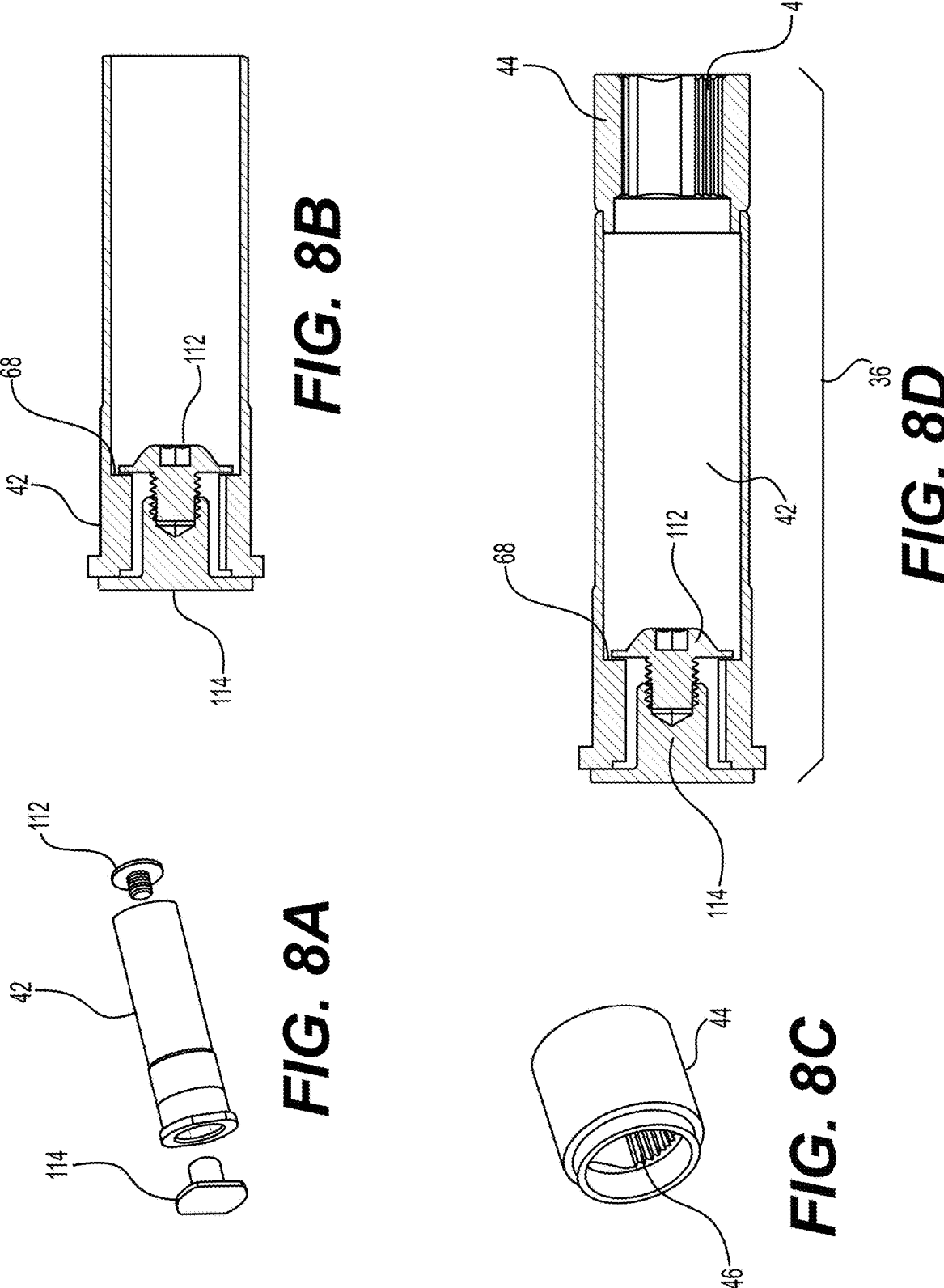
FIG. 8A, FIG. 8B, FIG. 8C and FIG. 8D show how to connect a first adapter component of the kit of FIG. 1 to a second adapter component of the kit of FIG. 1.

As shown in FIG. 8A, a flanged screw 112 may be inserted into one end of first adapter component 42, and a dummy standoff part 114 may be inserted into another end of first adapter component 42. First adapter component 42 may include a shelf 68 on a radially inward side of the first adapter assembly end 38. As shown in FIG. 8B, flanged screw 112 is inserted into first adapter component 42 such that flanged screw 112 rests on the shelf 68. Flanged screw is then connected to (e.g., screwed into) dummy standoff part 114, as shown in FIGS. 8B and 8D. Second adapter component 44, which is shown in FIG. 8C, may then be connected to first adapter component 42 (e.g., due to a tolerance fit therebetween). First adapter component 42 and second adapter component 44 may then be fixed with respect to one another (e.g., by welding).

Figure 9B:
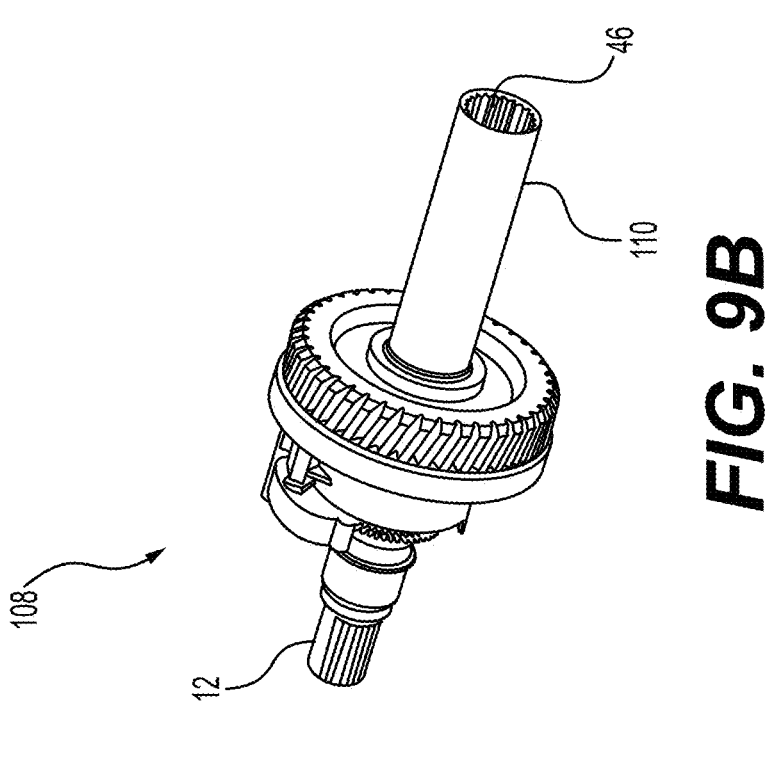
Figure 9A:
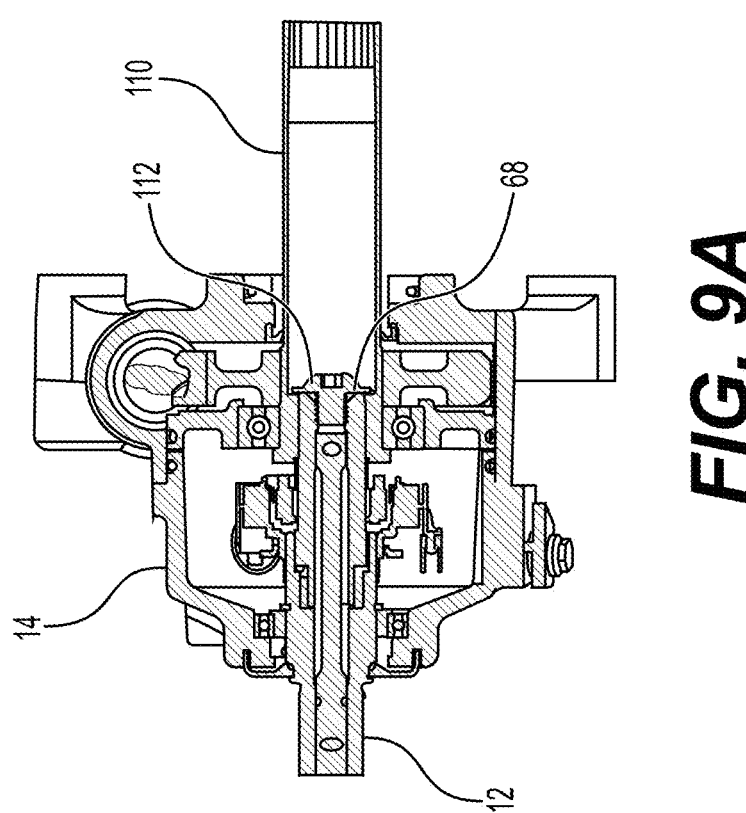
Figures 9C, 9D, 9E:
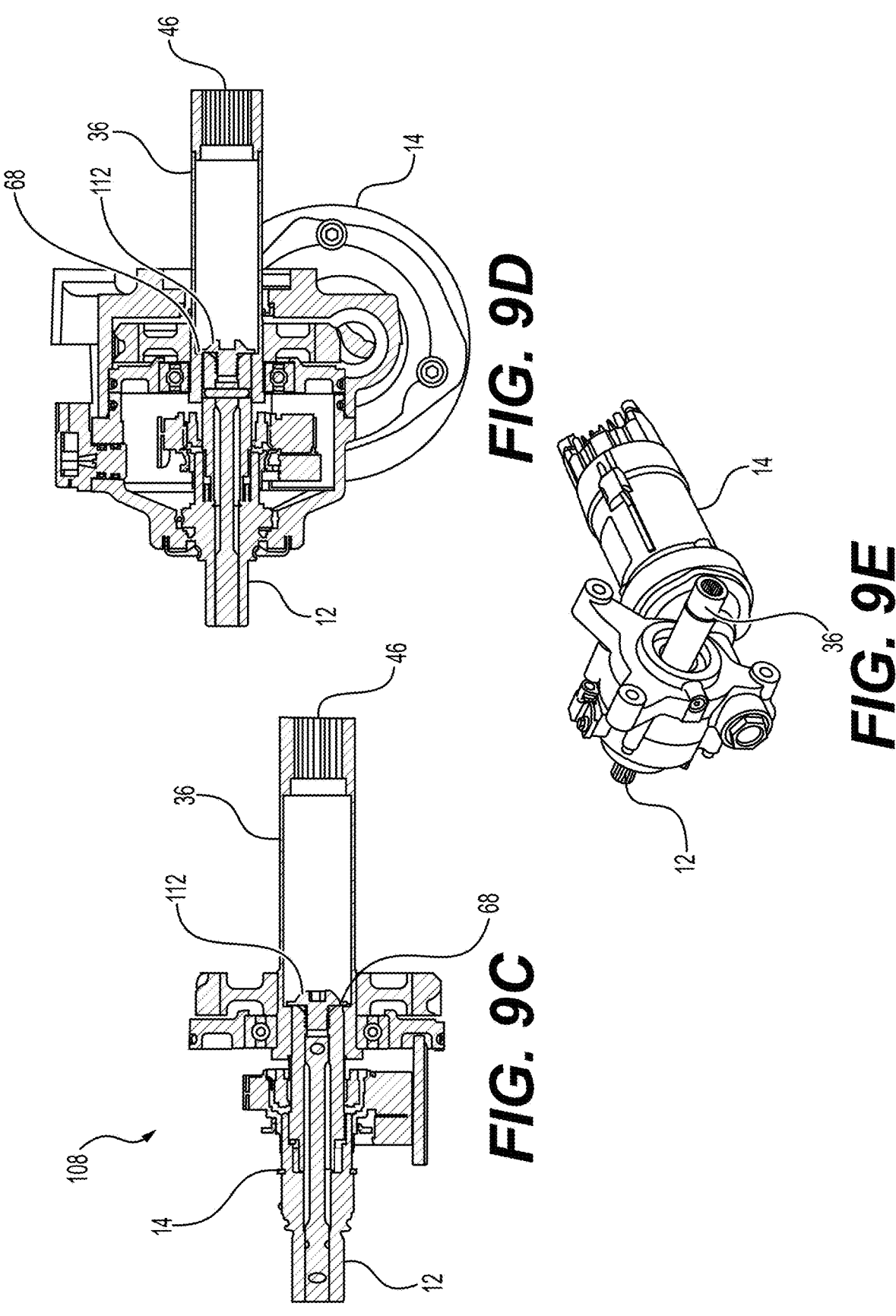

FIGS. 9A-9E show how to connect adapter assembly 36 to the output shaft 12 of electric motor 14. Electric motor 14 is shown in its initial state in FIG. 9A. A worm wheel assembly 108 is removed from electric motor 14, as shown in FIG. 9B. Worm wheel assembly 108 may include an original output shaft adapter 110. If so, original output shaft adapter 110 will need to be removed from output shaft 12 (e.g., by loosening flanged screw 112 and separating original output shaft adapter 110 from a remainder of worm wheel assembly 108). As shown in FIG. 9C, adapter assembly 36 may then be disposed on output shaft 12 of worm wheel assembly 108. Flanged screw 112 may be used to secure adapter assembly 36 to output shaft 12. Worm wheel assembly 108, with adapter assembly 36 connected thereto, may then be attached to electric motor 14, as shown in FIG. 9D. The resulting assembly is shown in FIG. 9E.

Figure 10B:
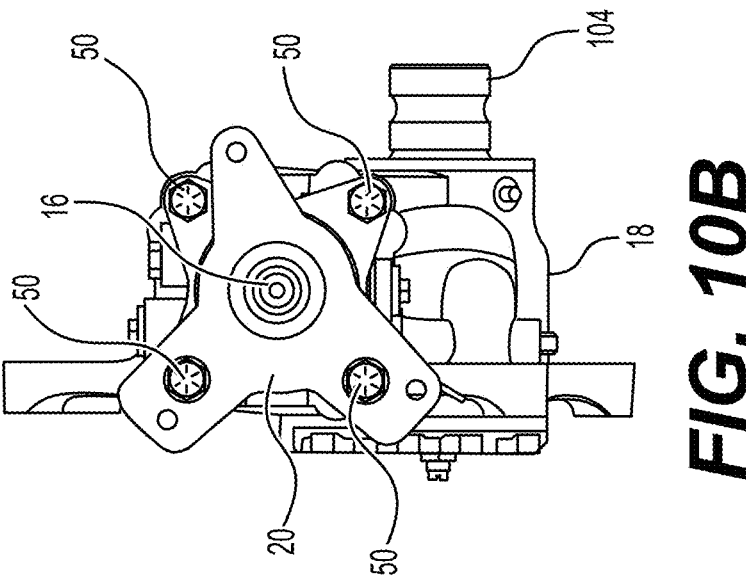
FIG. 10A and FIG. 10B show how a housing of the kit of FIG. 1 connects to an input shaft of a steering gear.
Figure 10A:
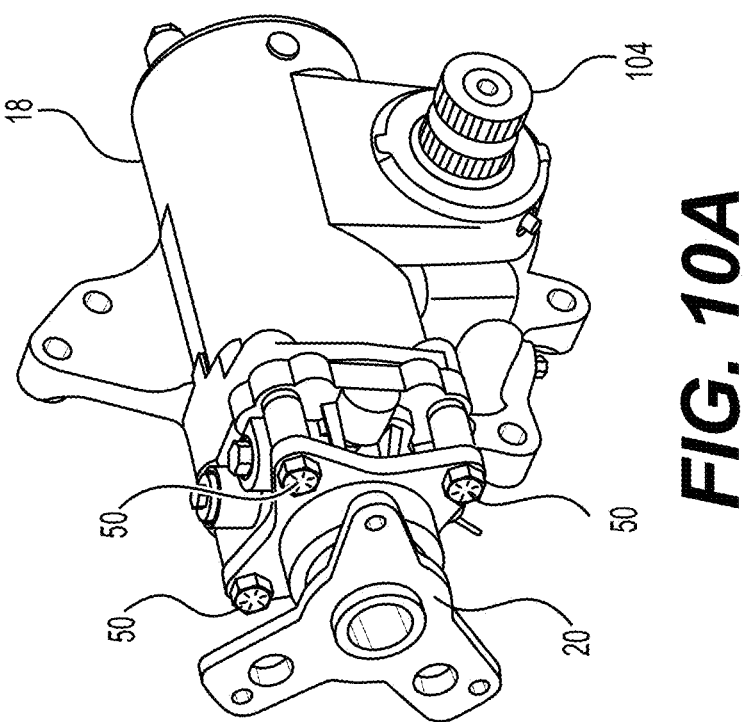

FIGS. 10A-10B show connection of housing 20 of kit 10 to input shaft 16 steering gear 18. As discussed in the context of FIGS. 3A-3F, housing 20 may include a steering gear bracket 34 disposed on a second central section end 26 of housing 20. Steering gear bracket 34 may include at least one steering gear bracket fastener guide 54. Connecting housing 20 to steering gear 18 may include inserting a fastener 50 through the at least one steering gear bracket fastener guide 54 of steering gear bracket 34 and into a steering gear fastener guide 64 of steering gear 18, then securing the fastener 50. Additional fasteners 50 may be similarly secured in other steering gear bracket fastener guides 54 and steering gear fastener guides 64.

Figures 11A, 11B, 11C:
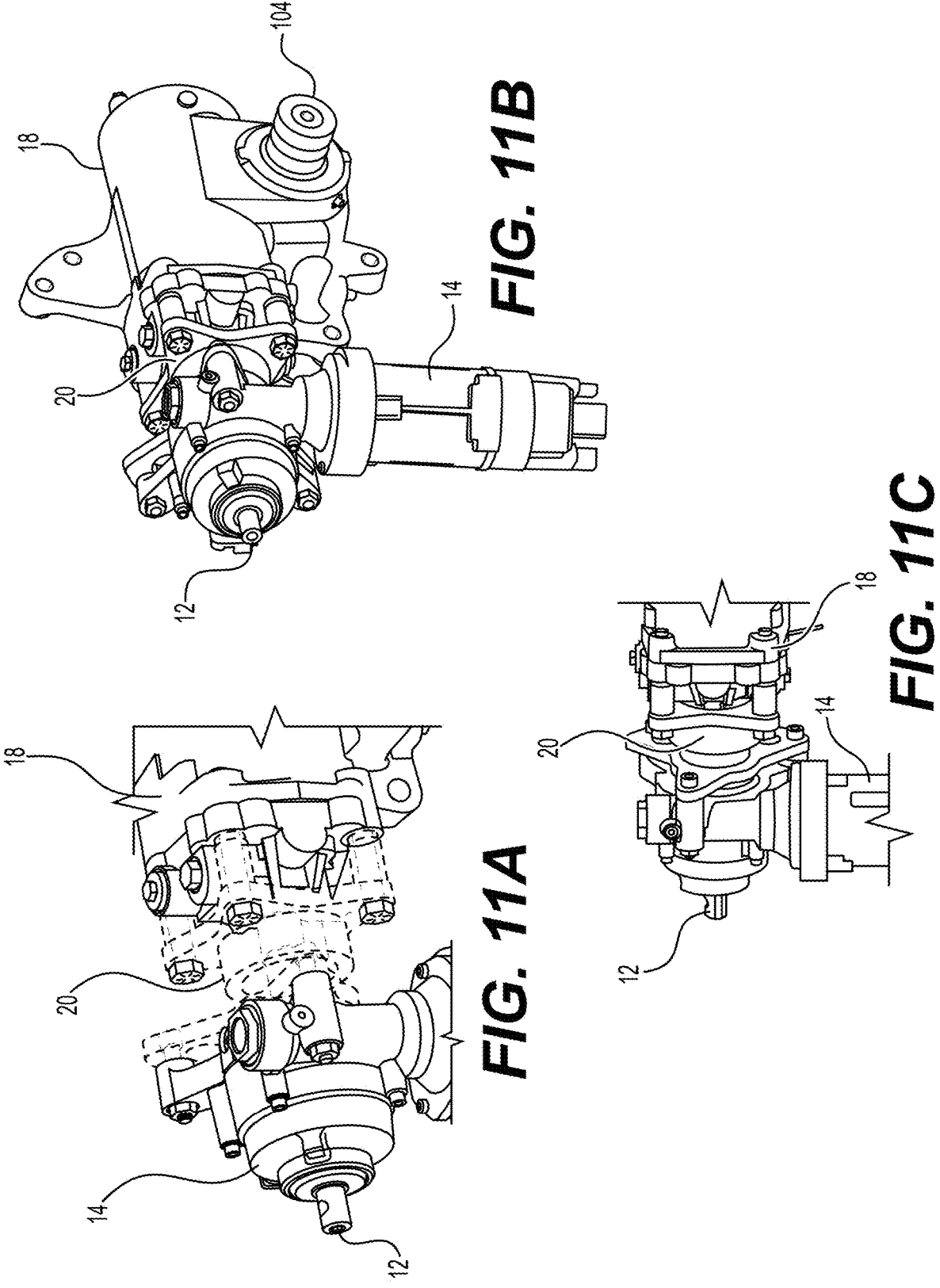

FIGS. 11A-11C show housing 20 of kit 10 being disposed between output shaft 12 of electric motor 14 and input shaft 16 of steering gear 18. As shown by the dashed lines in FIG. 11A, upon assembly, housing 20 will be disposed between electric motor 14 and steering gear 18.

As shown in FIG. 9D, second adapter assembly end 50 may include a plurality of serrations 46 configured to engage with a plurality of serrations 46 on input shaft 16. As such, connecting adapter assembly 36 to input shaft 16, as shown in FIGS. 11A-11C, may include inserting the second adapter assembly end 40 of adapter assembly 36 through the adapter assembly passage 30 of housing 20, aligning the plurality of serrations 46 on the second adapter assembly end 40 with the plurality of serrations 46 on the input shaft 16, and pressing the second adapter assembly end 40 on to the input shaft 16. Adapter assembly 36 may be freely rotatable within the adapter assembly passage 30 when adapter assembly 36 is disposed in adapter assembly passage 30.

After connecting adapter assembly 36 to input shaft 16, housing 20, which is already connected to steering gear 18, may be connected to electric motor 14. As discussed in the context of FIGS. 3A-3F, housing 20 may include an electric motor bracket 32 disposed on the first central section end 24. Electric motor bracket 32 may include at least one electric motor bracket fastener guide 52. As such, connecting housing 20 to electric motor 14 may include inserting a fastener 50 through the at least one electric motor bracket fastener guide 52 of electric motor bracket 32 and an electric motor fastener guide 66 of the electric motor 14, and securing the fastener 50. Additional fasteners 50 may be similarly secured in other electric motor bracket fastener guides 52 and electric motor fastener guides 66.

Figure 12:
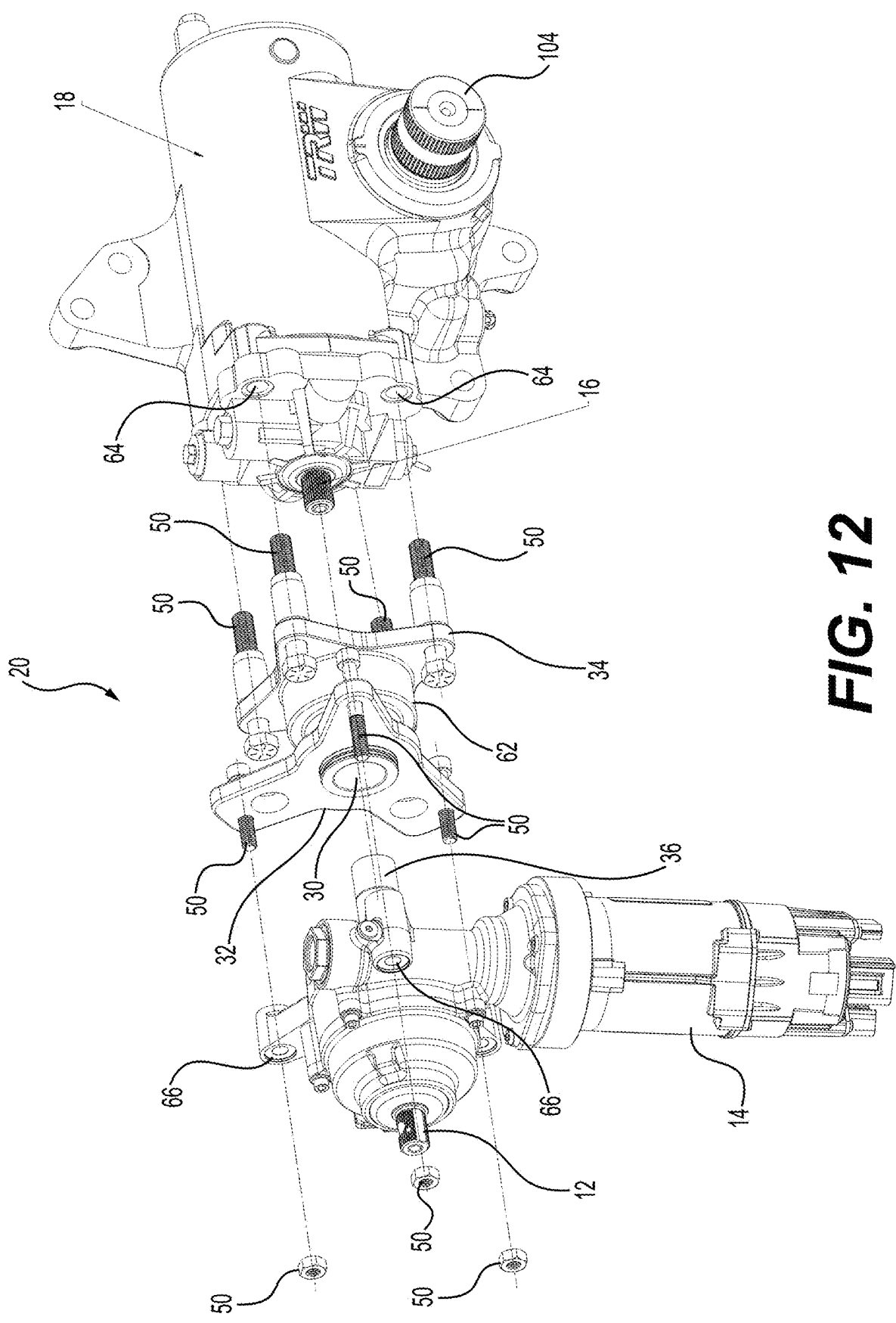
FIG. 12 shows a method for connecting an output shaft of an electric motor to an input shaft of a steering gear using the kit of FIG. 1.

FIG. 12 shows in more detail how kit 10 may be used to connect output shaft 12 of electric motor 14 to input shaft 16 of steering gear 18, as discussed in more detail herein.

Figure 13:
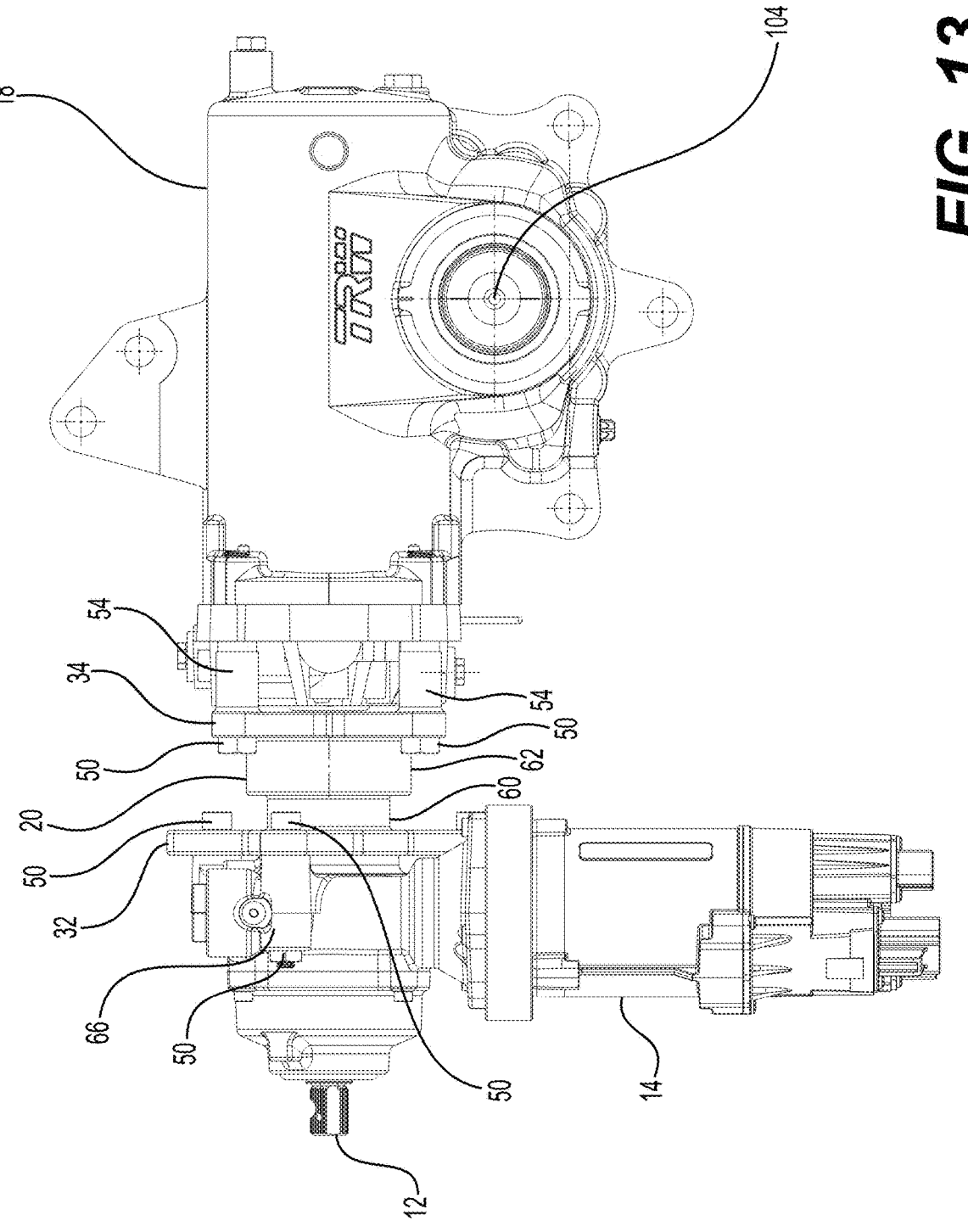
FIG. 13 shows a view of the assembly resulting from using the method of FIG. 12 to connect an output shaft of an electric motor to an input shaft of a steering gear.
Figure 14:
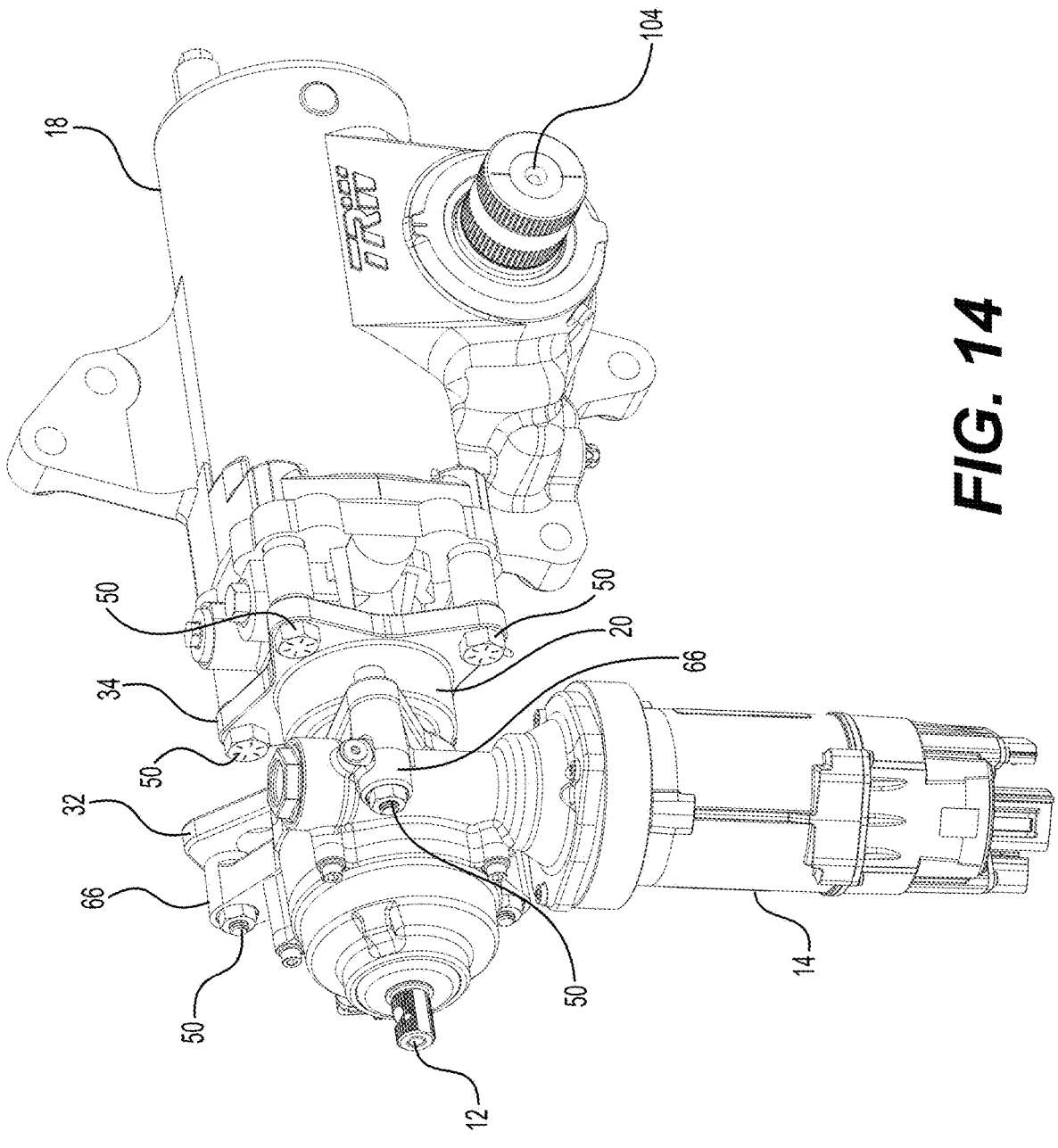
FIG. 14 shows another view of the assembly resulting from using the method of FIG. 12 to connect an output shaft of an electric motor to an input shaft of a steering gear.
Figures 15A, 15B:
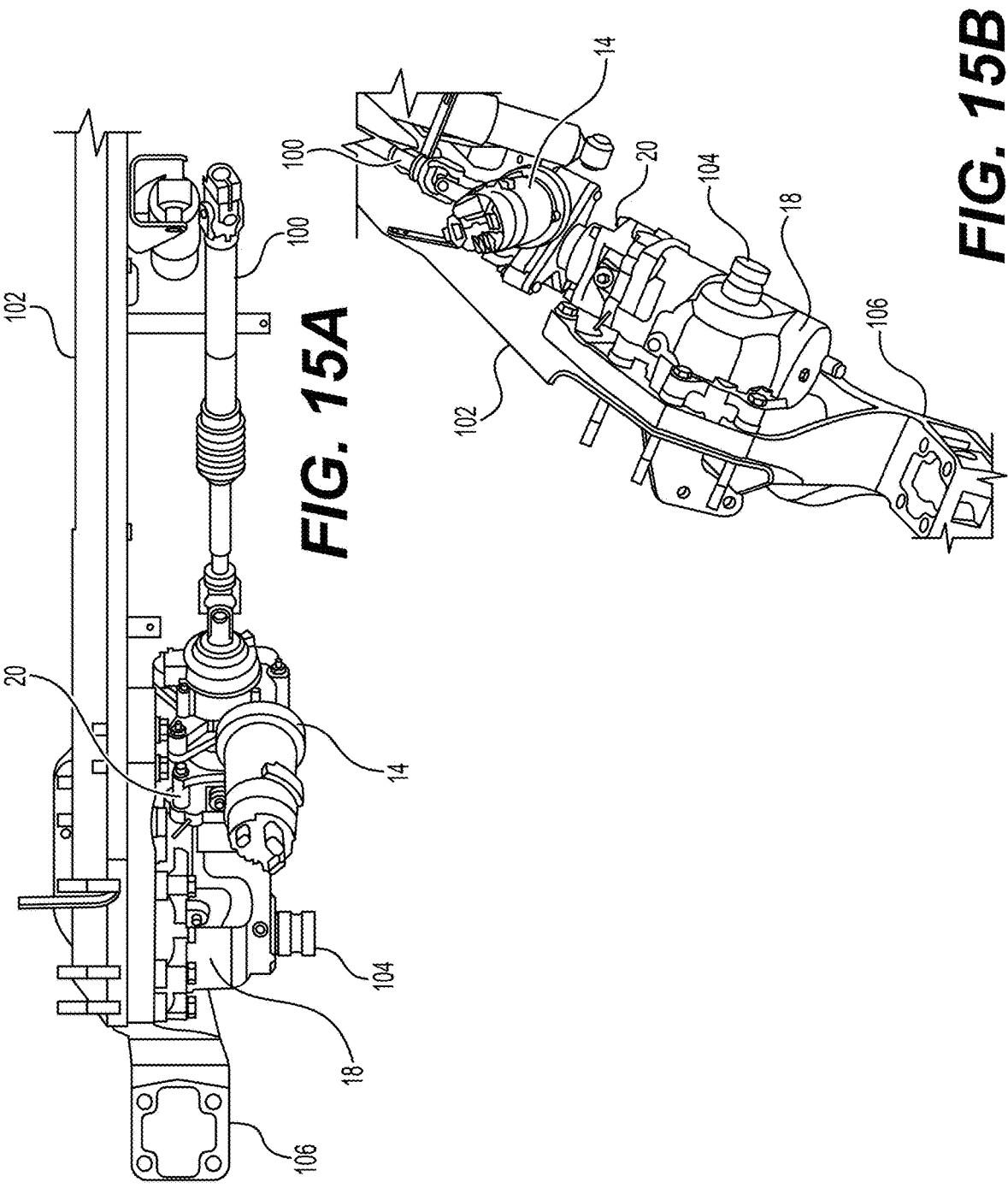
FIG. 15A, FIG. 15B, FIG. 15C and FIG. 15D show various views of an output shaft of an electric motor connected to an input shaft of a steering gear using the kit of FIG. 1, with the resulting assembly fitted to a base frame and multi-function bracket of a vehicle.
Figures 15C, 15D:
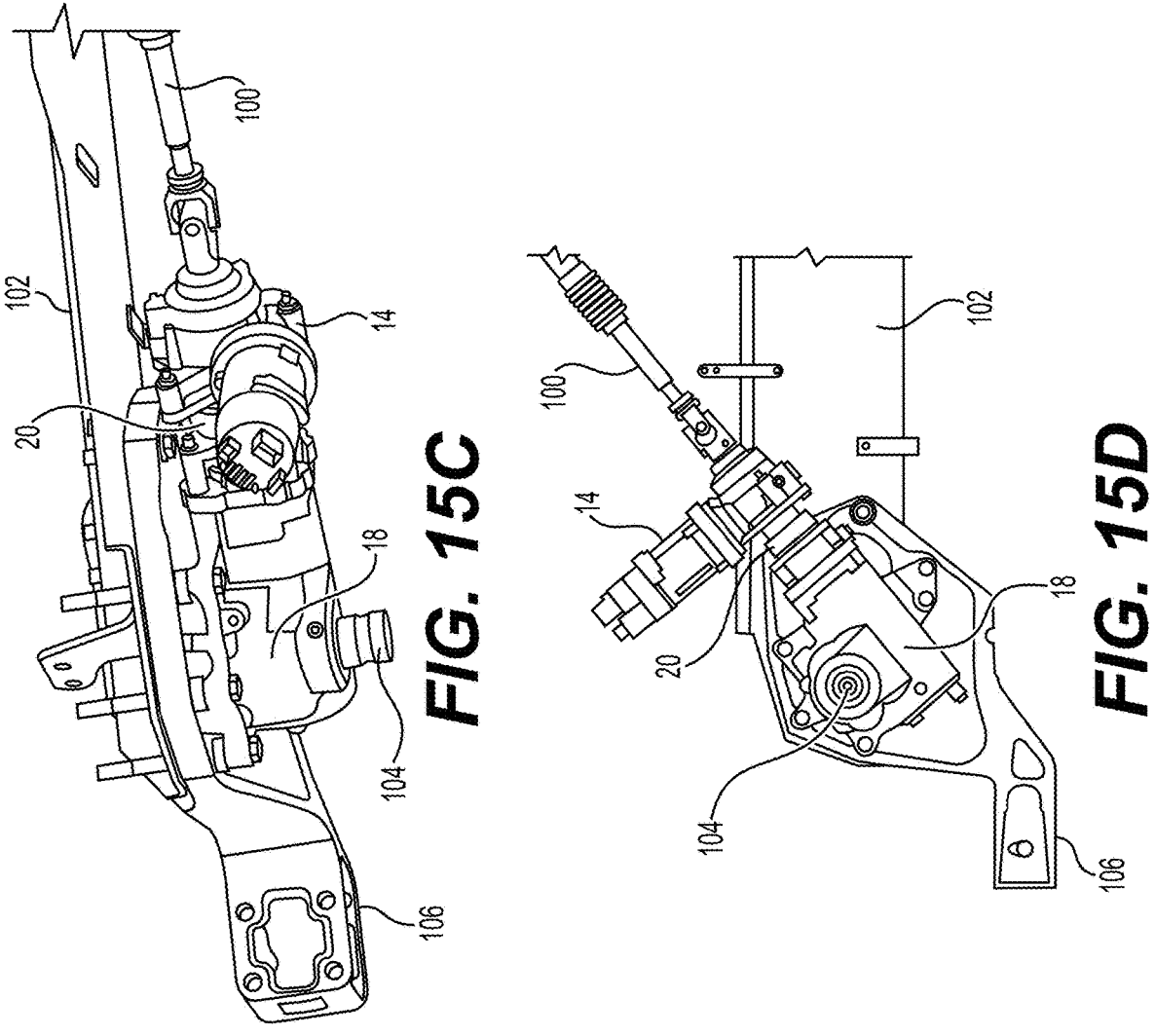

FIGS. 13-14 show output shaft 12 of electric motor 14 connected to input shaft 16 of steering gear 18 using kit 10. After such assembly, electric motor 14 and steering gear 18 may be accommodated in, for example, a multi-function bracket 106, which may be connected to a base frame 102 of a vehicle, as shown in FIGS. 15A-15D. Steering shaft 100 may then be connected to output shaft 12 of electric motor 14.

Figure 16:
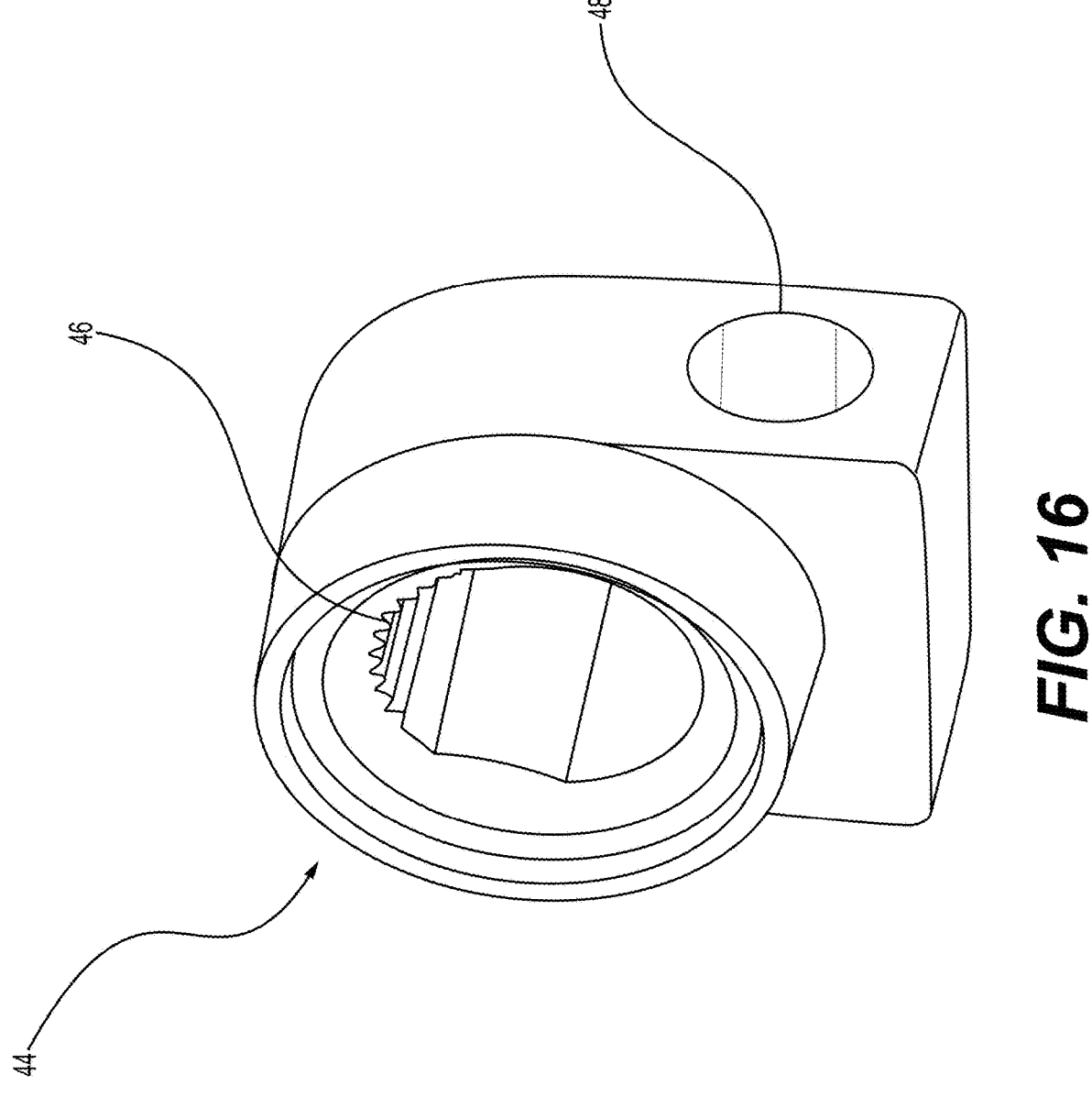
FIG. 16 shows another embodiment of a second adapter component of the kit of FIG. 1.

FIG. 16 shows another embodiment of second adapter component 44. In this embodiment, second adapter component 44 includes a second adapter component fastener guide 48 extending in a radial direction R. Second adapter component fastener guide 48 may be used, in conjunction with a fastener 50, to secure second adapter component 44 to, for example, input shaft 16 of steering gear 18.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

10 Kit
12 Output shaft
14 Electric motor
16 Input shaft
18 Steering gear
20 Housing
22 Central section
24 First central section end
26 Second central section end
30 Adapter assembly passage
32 Electric motor bracket
34 Steering gear bracket
36 Adapter assembly
38 First adapter assembly end
40 Second adapter assembly end
42 First adapter component
44 Second adapter component
46 Serrations
48 Second adapter component fastener guide
50 Fasteners
52 Electric motor bracket fastener guide
54 Steering gear bracket fastener guide
56 Electric motor bracket tabs
58 Steering gear bracket tabs
60 First central section part
62 Second central section part
64 Steering gear fastener guide
66 Electric motor fastener guide
68 Shelf
100 Steering shaft
102 Base frame
104 Sector shaft
106 Multi-function bracket
108 Worm wheel assembly
110 Original output shaft adapter
112 Flanged screw
114 Dummy standoff part
L Longitudinal direction
R Radial direction
$C_{60}$ Inner diameter of first central section part 60
$C_{62}$ Inner diameter of second central section part 62

What is claimed is:

1. A kit for retrofitting a hydraulic steering system by connecting an output shaft of an electric motor to an input shaft of a hydraulic steering gear, the kit comprising:
   a housing comprising:
      a central section having a first central section end and a second central section end, the central section defining an adapter assembly passage extending in a longitudinal direction between the first central section end and the second central section end and extending fully through the housing, an electric motor bracket disposed on the first central section end, and a steering gear bracket disposed on the second central section end; and an adapter assembly having a first adapter assembly end and a second adapter assembly end, wherein the adapter assembly is configured to be disposed in the adapter assembly passage and extend through the entire adapter assembly passage such that the first adapter assembly end is connectable to the output shaft and the second adapter assembly end is connectable to the input shaft.

2. The kit of claim 1, wherein the adapter assembly is disposable in the adapter assembly passage so as to be concentric with the adapter assembly passage.

3. The kit of claim 1, wherein the adapter assembly comprises a first adapter component and a second adapter component, and wherein the first adapter component and the second adapter component are fixed with respect to one another.

4. The kit of claim 3, wherein the first adapter component is configured to connect to the output shaft, and wherein the second adapter component is configured to connect to the input shaft.

5. The kit of claim 4, wherein the second adapter component comprises a plurality of serrations configured to engage with a plurality of serrations on the input shaft.

6. The kit of claim 3, wherein the second adapter component comprises a second adapter component fastener guide extending in a radial direction.

7. The kit of claim 1, further comprising:

at least two fasteners, wherein the electric motor bracket comprises at least one electric motor bracket fastener guide configured to receive a first fastener of the at least two fasteners, and wherein the steering gear bracket comprises at least one steering gear bracket fastener guide configured to receive a second fastener of the at least two fasteners.

8. The kit of claim 1, wherein the electric motor bracket comprises a plurality of electric motor bracket tabs extending in a radial direction, wherein each electric motor bracket tab of the plurality of electric motor bracket tabs comprises an electric motor bracket fastener guide configured to receive a fastener, and wherein each electric motor bracket fastener guide extends in the longitudinal direction.

9. The kit of claim 8, wherein the plurality of electric motor bracket tabs comprises three electric motor bracket tabs.

10. The kit of claim 1, wherein the steering gear bracket comprises a plurality of steering gear bracket tabs extending in a radial direction, wherein each steering gear bracket tab of the plurality of steering gear bracket tabs comprises a steering gear bracket fastener guide configured to receive a fastener, and wherein each steering gear bracket fastener guide extends in the longitudinal direction.

11. The kit of claim 10, wherein the plurality of steering gear bracket tabs comprises four steering gear bracket tabs.

12. The kit of claim 1, wherein the central section comprises a first central section part having a first inner diameter and a second central section part having a second inner diameter, and wherein the first inner diameter is not equal to the second inner diameter.

13. A method for connecting an output shaft of an electric motor to an input shaft of a steering gear, the method comprising:

providing the kit of claim 1;

connecting the adapter assembly to the output shaft;

connecting the housing to the steering gear;

disposing the adapter assembly in the adapter assembly passage;

connecting the adapter assembly to the input shaft; and connecting the housing to the electric motor.

14. The method of claim 13, wherein the adapter assembly comprises a first adapter component and a second adapter component, and wherein, prior to connecting the adapter assembly to the output shaft, the method further comprises fixing the first adapter component to the second adapter component.

15. The method of claim 13, wherein the first adapter assembly end comprises a shelf on a radially inward side of the first adapter assembly end, and wherein connecting the adapter assembly to the output shaft comprises disposing the first adapter assembly end on the output shaft, inserting a flanged screw into the first adapter assembly end such that the flanged screw rests on the shelf, and securing the flanged screw to the output shaft.

16. The method of claim 13, wherein the steering gear bracket comprises at least one steering gear bracket fastener guide, and wherein connecting the housing to the steering gear comprises inserting a fastener through the at least one steering gear bracket fastener guide and a steering gear fastener guide of the steering gear, and securing the fastener.

17. The method of claim 13, wherein the second adapter assembly end comprises a plurality of serrations configured to engage with a plurality of serrations on the input shaft, and wherein connecting the adapter assembly to the input shaft comprises inserting the second adapter assembly end through the adapter assembly passage, aligning the plurality of serrations on the second adapter assembly end with the plurality of serrations on the input shaft, and pressing the second adapter assembly end on to the input shaft.

18. The method of claim 17, wherein the adapter assembly is freely rotatable within the adapter assembly passage when disposed in the adapter assembly passage.

19. The method of claim 13, wherein the electric motor bracket comprises at least one electric motor bracket fastener guide, and wherein connecting the housing to the electric motor comprises inserting a fastener through the at least one electric motor bracket fastener guide and an electric motor fastener guide of the electric motor, and securing the fastener.

20. The method of claim 13, wherein the electric motor bracket comprises a plurality of electric motor bracket tabs extending in a radial direction, wherein each electric motor bracket tab of the plurality of electric motor bracket tabs comprises an electric motor bracket fastener guide configured to receive a fastener, each electric motor bracket fastener guide extending in the longitudinal direction, wherein the steering gear bracket comprises a plurality of steering gear bracket tabs extending in the radial direction, and wherein each steering gear bracket tab of the plurality of steering gear bracket tabs comprises a steering gear bracket fastener guide configured to receive a fastener, each steering gear bracket fastener guide extending in the longitudinal direction.

* * * * *